United States Patent [19]

Katsuta et al.

[11] Patent Number: 5,357,391
[45] Date of Patent: Oct. 18, 1994

[54] AUDIO TAPE CASSETTE, AUDIO TAPE AND PRODUCTION METHOD OF THE SAME

[75] Inventors: Yoshiharu Katsuta, Takatsuki; Kouzaburo Sato, Kameoka; Yuki Sakamoto, Nara; Yoshiyuki Takahira, Suita; Yasuo Yamasaki, Kyoto, all of Japan

[73] Assignee: Hitachi Maxell, Ltd., Osaka, Japan

[21] Appl. No.: 841,483

[22] Filed: Feb. 26, 1992

[30] Foreign Application Priority Data

Feb. 27, 1991 [JP] Japan ................................. 3-056109

[51] Int. Cl.$^5$ ..................... G11B 5/704; G11B 23/087
[52] U.S. Cl. ..................................... 360/132; 360/134; 428/323
[58] Field of Search ............... 360/132, 134; 264/242, 264/210.1, 210.3, 210.4, 210.6; 428/694 TB, 323

[56] References Cited

U.S. PATENT DOCUMENTS

| | | | |
|---|---|---|---|
| 3,843,035 | 10/1974 | Fitterer et al. | 242/199 |
| 4,337,288 | 6/1982 | Takenaka et al. | 360/134 |
| 4,439,492 | 3/1984 | Wada et al. | 428/409 |
| 4,555,443 | 11/1985 | Kikugawa et al. | 360/134 |
| 4,590,119 | 5/1986 | Kawakami et al. | 360/134 |
| 4,618,535 | 10/1986 | Nishimatsu et al. | 360/134 |
| 4,635,877 | 1/1987 | Oishi et al. | 226/196 |
| 4,643,934 | 2/1987 | Kajimoto et al. | 360/134 |
| 4,699,845 | 10/1987 | Oikawa et al. | 360/134 |
| 4,930,032 | 5/1990 | Miyoshi et al. | 360/132 |

FOREIGN PATENT DOCUMENTS

4026190 2/1991 Fed. Rep. of Germany .

OTHER PUBLICATIONS

World Patents Index Latest, Section Ch, Week 9044, Derwent Publication Ltd., London, GB; Class L, AN 90-335079 and WO-A-9 012 392, (Hitachi Maxell), 18 Oct. 1990, abstract only.

World Patents Index Latest, Section Ch, Week 9044, Derwent Publications Ltd., London, GB; Class A, AN 90-331831 and JP-A-2 238 931, (Taiyo Yuden K.K.), 21 Sep. 1990, abstract only.

Foreign Search Report, (The Hague, Jun. 26, 1992, S. Klocke).

*Primary Examiner*—Robert S. Tupper
*Assistant Examiner*—Kevin M. Watkins
*Attorney, Agent, or Firm*—Birch, Stewart, Kolasch & Birch

[57] ABSTRACT

An audio tape cassette having a magnetic tape which is wound around a hub, a cassette shell and guiding parts which comprises a polypropylene resin including inorganic particles "A" dispersed in the tape cassette, wherein the magnetic tape has a back coating layer containing a polyester resin and inorganic particles "B" which have a hardness of not larger than that of the inorganic particles "A", and the magnetic tape has a CP value which is not larger than 1000 $\mu$m.

6 Claims, No Drawings

AUDIO TAPE CASSETTE, AUDIO TAPE AND PRODUCTION METHOD OF THE SAME

BACKGROUND OF THE INVENTION

1. Field of the Invention

The present invention relates to an audio tape cassette audio tape combination which is suitable for recording high quality sound with less noise and a method for producing the audio cassette tape. More particularly, it relates to an audio tape cassette used together with an audio cassette tape which exhibits less deterioration in output-signals and less drop out of signals.

2. Description of the Related Art

Recently, [an] audio cassette tapes have been required to record high quality sound with less noise, as compact discs becomes popular. Therefore, in order to prevent vibration of a cassette shell, a softer material for the cassette shell is required over the conventional materials selected.

In the prior art, there is used a conventional cassette shell which is made of polystyrene resin, but this resin is hard and has less vibration absorbance at room temperature. In order to satisfy the demand mentioned above, it is proposed to use a new cassette shell which is made of polypropylene resin and, further, to add an inorganic powder such as calcium carbonate, talc, zinc oxide and mixtures thereof as a filler so as to increase the density of the resin.

In order to reliably reproduce sound from a source, some recent audio tape cassette tapes have been proposed having a back coating layer which has a proper roughness to give a proper friction condition with the tape transportation parts of a recording-reproducing apparatus so as to improve runability of the tape.

It is popular to form the back coating layer from a paint comprising certain size inorganic particles dispersed in a binder.

However, since the binder is too weak to hold the inorganic particles in the back coating layer formed from a paint, the particles easily drop in the form of pieces, accumulate on a site at which a tape and a guide part are contacted and then form minute protrusions at the site. As a result, the minute protrusions push the running tape from the back coating side to cause defects, such as cracks and streaks, in the magnetic layer.

The defects in the magnetic layer may cause various problems such as drop out.

SUMMARY OF THE INVENTION

An object of the present invention is to provide an audio tape cassette which is suitable for recording high quality sound with less noise.

These objects of the present invention are achieved by an audio tape cassette and audio tape combination comprising a magnetic tape which is wound around a hub, in a cassette including a cassette shell and its guiding parts which shell and guiding parts comprise a polypropylene resin with inorganic particles "A" dispersed therein, and wherein the magnetic tape has a back coating layer comprising a polyester resin and inorganic particles "B" which have a hardness of not larger than that of the inorganic particles "A", and a CP value (criterion of flexural strength which is not larger than 1000 $\mu$m.

To complete the present invention, an investigation has been made as to the hardness of inorganic particles. As a result, it has been found that, the number of inorganic particles dropping out from the back coating layer is substantially decreased when the inorganic particle "A" in the cassette is harder than that of the inorganic particle "B" in the backcoating layer of the cassette tape.

To prevent accumulation of the particles which might drop out on the guiding parts, other investigations have been made as to the composition of the backcoating layer. As a result, it has been found that a drawn polyester resin is most suitable for the backcoating layer, since it includes no adhesive component and is crystalline tougher than most conventional resins used for the backcoating layer, such as polyvinyl chloride, cellulous resins and polyurethane. The resin selected to be used in the invention in the back coating layer of the cassette tape also imparts flexibility to the magnetic layer which can stand partial deformation.

DETAILED DESCRIPTION OF THE INVENTION

Now, the present invention will be explained in detail.

The present invention relates to an audio tape cassette and a magnetic tape which is wound around a hub, of the cassette including a cassette shell and guiding parts which comprise a polypropylene resin including inorganic particles "A" dispersed therein, wherein the magnetic tape has a back coating layer comprising a polyester resin and inorganic particles "B" which have a hardness of not larger than the inorganic particles "A", and a CP value which is not larger than 1000 $\mu$m.

The particle "A" is preferably calcium carbonate, talc or zinc oxide, and its particle size is preferably not larger than 10 $\mu$m. The particle "B" is preferably calcium carbonate, talc or kaolin, and it is desirable for the particle to be softer than particle "A", and its particle size is preferably from 0.05 to 2 $\mu$m.

A crystalline polyester resin is especially preferable for the composition of the back coating layer. The CP value is a criteria of a flexural strength of the magnetic tape. The CP value of the magnetic layer should be not larger than 1000 $\mu$m. The CP value is a parameter which reflects the flexibility of a tape and is defined as a distance between parallel outer surfaces of a magnetic layer at the point of appearance of cracks when the tape is folded back on itself with its magnetic layer facing outward, and a curvature of bending point is gradually reduced. The CP value is measured by a 180 degree-bent magnetic tape sandwiched between a pair of plates with the magnetic layer being faced outward, as stated above. The distance between the plates (outer surfaces of the magnetic layer) narrowed and the distance at which a crack first appears is recorded as the CP value.

To meet the CP value of not larger than 1000 $\mu$m, the magnetic layer itself has to be flexible. The flexibility of the magnetic layer may depend on the kind of binder rather than the magnetic powder.

For practical selection of a suitable binder, it is convenient to measure elongation at break. The elongation at break of a base film(uncured film) is preferably at least 100% to achieve a CP value of 1000 $\mu$m or less.

To produce the audio tape cassette tape of the present invention, it is necessary to form the back coating layer comprising a polyester resin and the inorganic particle "B". Although any method may be applied to form the back coating layer, it is preferable to form the back coating layer by melting the polyester resin containing the inorganic particle "B" dispersed therein, extruding the resin from a slit, biaxially stretching the extruded film, and using the stretched film as the backcoating layer.

The back coating film may be used independently or in combination with other melted resins as a substrate, squeezing them out from separate slits to obtain a laminate film.

The cassette shell is made by melting the a polypropylene resin containing the inorganic particle "A" dispersed therein followed by injection molding. It is necessary to provide spaces in the cassette shell for the tape guiding parts. Finally, the tape roll is set in the cassette shell.

In the present invention, in the magnetic layer, any conventional binder resin may be used for the production of the magnetic recording media independently or in combination. Examples of the binder resins are cellulose resin, vinyl chloride-vinyl acetate copolymer, polyurethane resin, phenol resin, amino resin, isocyanate compound, and radiation curing resin. An essential requirement is that the CP value of the magnetic layer be not larger than 1000 $\mu$m.

In a magnetic paint, any conventional organic solvent may be used independently or in combination. Examples of the organic solvents are methyl isobutyl ketone, methyl ethyl ketone, cyclohexanone, toluene, ethyl acetate, tetrahydrofuran, and dimethylformamide.

In addition to the inorganic particles "B", any conventional additive such as a lubricant, a dispersant and an antistatic may be added to the back coating layer.

As the magnetic powder, any conventional magnetic powder may be used. Specific examples of the magnetic powder are metal oxide (e.g. $\gamma$—$Fe_2O_4$, $Fe_3O_4$, cobalt-containing $\gamma$—$Fe_2O_3$, cobalt-containing $Fe_3O_4$ and $CrO_2$) plate form ferrite magnetic powder (e.g. barium ferrite) and metallic powder (e.g. iron, cobalt and iron-nickel alloy).

The magnetic layer is produced by applying a magnetic paint containing the magnetic powder, the organic binder resin and the organic solvent on the substrate and drying the magnetic paint to form the magnetic layer.

In the present invention, a support film need not be used. However, when a support film is used, a synthetic resin film such as a film of polyester, polyamide, polyimide and polyamide cellulose derivative is preferred. A film made by melting other resins may be laminated on the back coating layer.

PREFERRED EMBODIMENTS

The present invention will be illustrated by the following Examples, in which "parts" are by weight unless otherwise indicated.

EXAMPLE 1

The following components were well kneaded and dispersed in a sand grinder mill:

| Component | Parts |
| --- | --- |
| $\alpha$-Fe magnetic powder (average particle size of 0.25 $\mu$m) | 100 |
| Vinyl chloride-vinyl acetate vinyl alcohol copolymer (Eslec A manufactured by Sekisui Chemical Industry) | 11.2 |
| Polyurethane resin (T-5250 manufactured by Dainippon Ink Chemical Industry) | 8.8 |

| Component | Parts |
| --- | --- |
| Carbon black (average particle size of 0.024 $\mu$m) | 4.0 |
| $\alpha$-$Fe_2O_3$ powder (average particle size of 1.5 $\mu$m) | 2.0 |
| Myristic acid | 3.0 |
| Cilicone oil | 3.0 |
| Cyclohexanone | 115.0 |
| Toluene | 115.0 |

Then, to the mixture, a polyisocyanate compound (Colonate L manufactured by Nippon Polyurethane) (5 parts) was added to prepare a magnetic paint.

Meltable polyester resin containing 0.2% by weight of dispersed calcium carbonate having a particle size of 0.3 $\mu$m and a meltable polyethylene terephthalate resin containing 0.05% by weight dispersed silicon dioxide having a particle size of 0.2 $\mu$m were co-extruded to obtain a laminated film, which was then biaxially stretched to a thickness of 7.5 $\mu$m.

Then the magnetic paint was applied on the surface of the polyethylene terephthalate resin layer and dried to form a magnetic layer having a thickness of 5.0 $\mu$m and calendered to obtain the magnetic layer having a thickness of 4.0 $\mu$m.

This magnetic tape was wound around a hub with its magnetic layer facing outward to make a tape roll.

Polypropylene resin containing dispersed calcium carbonate and talc both having a particle size of 0.2 $\mu$m as inorganic particles "A" was injection molded at a temperature of 250° C. to form a cassette shell having guiding parts in it, and the tape roll was set in the cassette shell to fabricate the cassette combination.

Signals of 10 kHz were recorded at −20 dB on the cassette tape and the signals were reproduced 200 times continuously at temperature of 30° C. and relative humidity of 60% using a runability test machine (a cassette deck, TCK-333ESG, manufactured by Sony Corp.), while monitoring reproducing output.

During the test, no deterioration of the output signals of drop-out were observed. No deposition was found on the guiding parts in the cassette shell.

The audio tape cassette tape of the present invention exhibits less deterioration in output-signals and less drop-out of signals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An audio tape cassette comprising in combination a magnetic tape wound around a hub, a cassette shell, and guiding parts, wherein said cassette shell, guiding parts, and hub are formed of a polypropylene resin including a first type of inorganic particles dispersed therein, said magnetic tape having a magnetic layer and a back coating layer, said back coating layer comprising a crystalline polyester resin and a second type of inorganic particles different from said first type of inorganic particles dispersed therein, said second type of inorganic particles having a hardness not larger than that of said first type of inorganic particles, said magnetic layer having a CP value which is not larger than 1000 $\mu$m.

2. An audio tape cassette according to claim 1, wherein said first type of inorganic particles are selected from at least one member of the group consisting of calcium carbonate, talc and zinc oxide, and have a particle size of not larger than 10 μm.

3. An audio tape cassette according to claim 1, wherein said second type of inorganic particles are selected from at least one member of the group consisting of calcium carbonate, talc and kaolin, and have a particle size ranging from 0.05 to 2 μm.

4. An audio tape cassette according to claim 1, wherein said second type of inorganic particles are softer than said first type of inorganic particles.

5. A method for producing an audio tape cassette-audio tape, which comprises the steps of:

melting a crystalline polyester resin containing a first type of inorganic particles dispersed therein, extruding said melt from a slit to form a film, biaxially stretching said film, applying a magnetic paint containing a dispersed magnetic powder on a surface of said film to form a magnetic layer, drying said magnetic paint and smoothing its surface to form a magnetic tape, melting a polypropylene resin having dispersed therein a second type of inorganic particles different from said first type of inorganic particles and injection molding said melt to form said tape cassette including a cassette shell, guiding parts and a hub, winding said magnetic tape around said hub of said tape cassette with said magnetic layer facing outward to make a tape roll, and setting said tape roll wound around said hub in said tape cassette shell, said first type of inorganic particles having a hardness not larger than a hardness of said second type of inorganic particles and said magnetic layer having a CP value which is not larger than 1000 μm.

6. The method of producing an audio tape cassette-audio tape as in claim 5, wherein said first type of inorganic particles are selected from at least one member of the group consisting of calcium carbonate, talc and kaolin, and have a particle size ranging from 0.05 to 2 μm, and said second type of inorganic particles are selected from at least one member of the group consisting of calcium carbonate, talc and zinc oxide, and have a particle size of not larger than 10 μm.

* * * * *